United States Patent
Anderson

(10) Patent No.: US 12,099,285 B1
(45) Date of Patent: Sep. 24, 2024

(54) DECORATIVE SWIMMING POOL ILLUMINATION DEVICE

(71) Applicant: Marcus Anderson, Pompano Beach, FL (US)

(72) Inventor: Marcus Anderson, Pompano Beach, FL (US)

( * ) Notice: Subject to any disclaimer, the term of this patent is extended or adjusted under 35 U.S.C. 154(b) by 260 days.

(21) Appl. No.: 17/889,531

(22) Filed: Aug. 17, 2022

(51) Int. Cl.
G03B 21/14 (2006.01)
F21S 10/02 (2006.01)
F21V 31/00 (2006.01)
F21W 131/401 (2006.01)

(52) U.S. Cl.
CPC .......... G03B 21/145 (2013.01); F21S 10/026 (2013.01); F21V 31/005 (2013.01); F21W 2131/401 (2013.01)

(58) Field of Classification Search
CPC .... G03B 21/145; F21S 10/026; F21V 31/005; F21W 2131/401
See application file for complete search history.

(56) References Cited

U.S. PATENT DOCUMENTS

| | | | |
|---|---|---|---|
| 6,564,484 B1 | 5/2003 | Ikenaga et al. | |
| 6,755,349 B2 * | 6/2004 | Beidokhti | B05B 17/08 239/18 |
| 6,798,154 B1 * | 9/2004 | Sullivan | F21S 8/00 315/158 |
| 7,018,053 B2 * | 3/2006 | Dwyer | H04N 9/3141 348/E5.143 |
| 7,753,576 B2 | 7/2010 | Marcinkewicz et al. | |
| 8,123,372 B1 * | 2/2012 | Ball | F21S 8/00 362/267 |
| 2005/0012909 A1 * | 1/2005 | Kokin | G03B 21/30 353/70 |
| 2006/0176686 A1 * | 8/2006 | McVicker | F21S 9/022 362/183 |
| 2017/0221397 A1 * | 8/2017 | Reddy | G02B 23/22 |
| 2017/0292686 A1 * | 10/2017 | Fuller | F21V 31/005 |
| 2021/0262638 A1 * | 8/2021 | Zhao | F21S 9/037 |

* cited by examiner

*Primary Examiner* — Tsion Tumebo
(74) *Attorney, Agent, or Firm* — Sanchelima & Associates, P.A.; Christian Sanchelima; Jesus Sanchelima

(57) ABSTRACT

A decorative swimming pool illumination device including a housing assembly having a projector assembly in the inner thereof and a drive device in a bottom portion thereof. The housing assembly includes a housing which has a dome hollow body with apertures in a top portion thereof and a hollow base. The projector assembly includes projector members which are placed in the apertures of the housing to allow display a plurality of images/colors. The drive device includes a drive device attached to the base of the housing and includes a wheeled portion that allows the housing to creep along the bottom of a swimming pool to display the images/colors by the projector members.

4 Claims, 3 Drawing Sheets

DECORATIVE SWIMMING POOL ILLUMINATION DEVICE

II. BACKGROUND OF THE INVENTION

1. Field of the Invention

The present invention relates to a decorative swimming pool illumination device and, more particularly, to a decorative swimming pool illumination device that can be propelled along the floor of a swimming pool illuminating the area with a LED system.

2. Description of the Related Art

Several designs for swimming pool devices have been designed in the past. None of them, however, include a LED system of varying color integrated in a wheeled device propelled by a drive system along the floor of a swimming pool to illuminate thereof.

Applicant believes that a related reference corresponds to U.S. Pat. No. 6,564,484 issued for a system for tanks of water that includes a moving illuminated decorative jelly toy. Applicant believes that another related reference corresponds to U.S. Pat. No. 7,753,576 issued for a flotation device for use when swimming that include a plurality of LEDs that illuminate the float. None of these references, however, teach of a swimming pool decorative light device comprising a wheeled device with a drive system that propels the device along the floor of a swimming pool, wherein the device includes a LED illumination system or varying color. The device includes a solar cell and battery for a power source.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to a decorative swimming pool illumination device that has a drive system integrated therein with a wheeled device to allow movement along the floor of the swimming pool.

It is another object of this invention to provide a decorative swimming pool illumination device that includes a LED system of varying color.

It is still another object of the present invention to provide a rechargeable device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
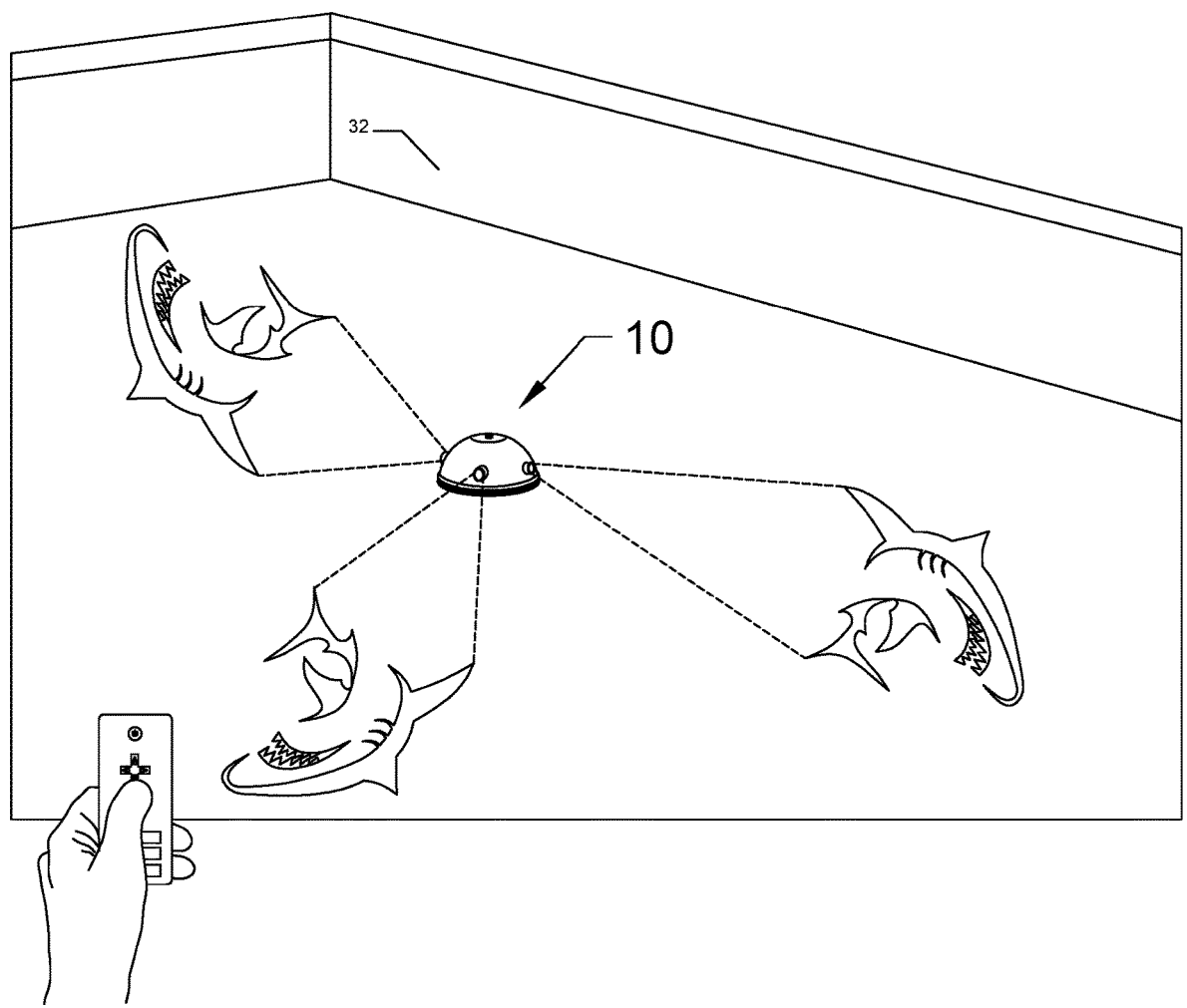

With the above and other related objects in view, the invention consists in the details of construction and combination of parts as will be more fully understood from the following description, when read in conjunction with the accompanying drawings in which:

FIG. 1 represents an operational view of the present invention 10 immersed in a pool 32.

Figure 2:
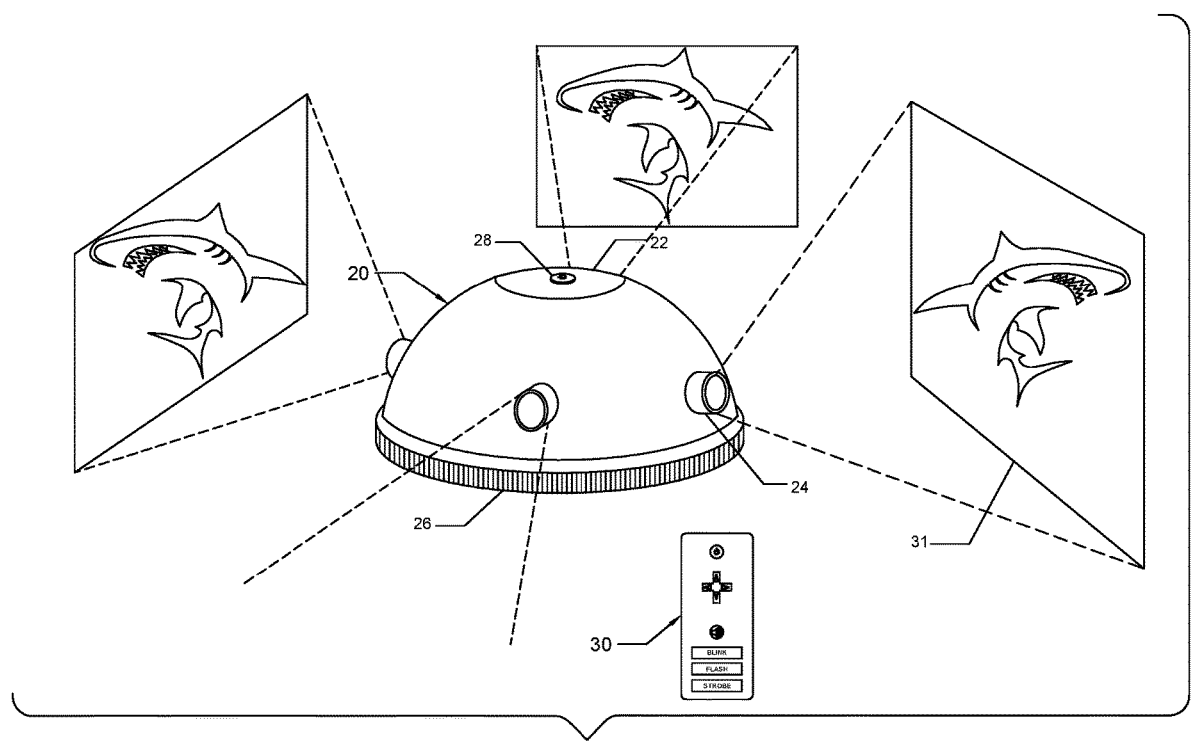

FIG. 2 shows an isometric view of the housing assembly 20. Showing the aperture 24 wherein the projector assembly 40 displays images/colors 31.

Figure 3:
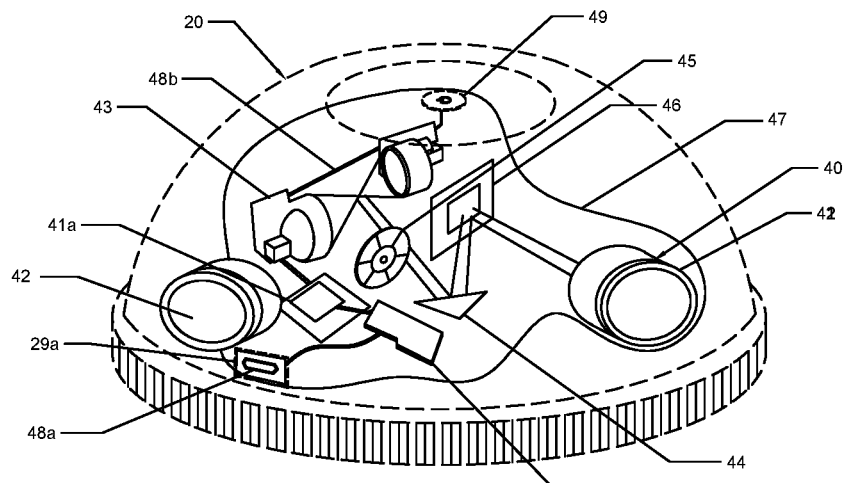

FIG. 3 illustrates an internal isometric view of the projector assembly 40 wherein is shown the waterproof cover 47.

Figure 4:
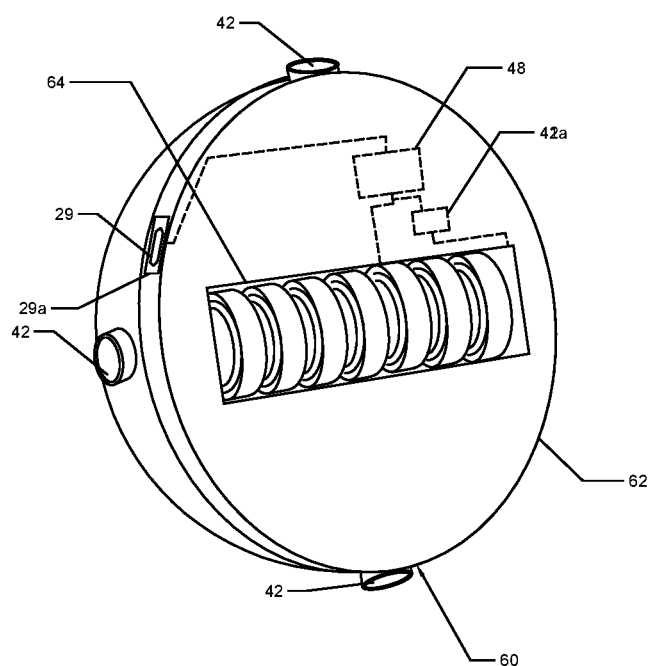

FIG. 4 is a representation of isometric view of a drive system assembly 60 wherein is shown a drive system 62 and a wheeled portion 64.

V. DETAILED DESCRIPTION OF THE EMBODIMENTS OF THE INVENTION

Referring now to the drawings, where the present invention is generally referred to with numeral 10, it can be observed that it basically includes a housing assembly 20, a projector assembly 40 and a drive system 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 includes a housing 22, apertures 24, a base 26, a second aperture 28, inputs 29, a sealing cap 29a, a remote control 30, images/colors 31 and a pool 32. In a suitable embodiment, the housing 22 may be configured to store the projector assembly 40 which may partially occupy the inner of the housing 22 allowing to display the projector assembly 40 by the apertures 24 which has a cylindrical hollow shape and may extend outwardly from a middle portion of the housing 22. The apertures 24 may be placed along a circular top contour of the housing 22 every 90 degrees relative to each other. The housing 22 may be made of a resistant plastic material which allows durability when inserting into the water. It is to be considered that the housing 22 is configured to be inserted in the inner of the pool 32 to display by the projector assembly 40 figures. In one embodiment, the housing 22 may have a dome body. Nevertheless, in other embodiments, the housing 22 may have a square body, triangular body, rectangular body, or any other variation thereof. The housing 22 may have the base 26 which may surround the bottom contour thereof and may also outline the drive device assembly 60. The base 26 may be configured to support the projector assembly 40 by covering the bottom area of the housing 22. It may be considered that the base 26 and the apertures 24 may be made of a similar material as the housing 22 may be made of, thereby conforming the body of the housing assembly 20. The base 26 may have a shape that conforms with the bottom contour of the housing 22. In a preferred embodiment the apertures 24 may be configured to store the projector members 42 therein and the base 26 may be configured to store the drive device assembly 60 therein.

As best observed in FIG. 2 the second aperture 28 may be placed in a top central portion of the housing 22 wherein the second aperture 28 may have a circular body and may be considered that the second aperture 28 may be configured to store a led indicator 49 which may have a shape that conforms with said second aperture 28. In FIG. 3 as observed the input 29 may be placed proximal to the base 26 wherein the input 29 may be further interconnected with a battery 48. In a suitable embodiment the input 29 may be sealed by a sealing cap 29a which may be made of a rubber material allowing to completely seal the input 29 to protect from water when a user dive the housing 22. It is known in the art that the input 29 may be a type of USB port or any other input that is capable of recharging a conventional battery.

The remote control 30 is shown in FIG. 3 where it is to be considered that the remote control 30 may allow monitoring of the projector assembly 40. In a suitable embodiment, the remote control 30 may be a conventional infrared system that permits to control the projector assembly 40 in a predetermined distance between each other. In another embodiment, the remote control 30 may be any type of smart device which is a compatible device with the projector assembly 40. It is to be considered that by activating the projector assembly 40 and placing the housing 22 in the inner of the pool 32 may allow to display images/colors 31 in the pool 32 with a predetermined 90 degree position around the housing 22 as best observed in FIG. 2 and FIG. 1. In a preferred embodiment, a microcontroller 42a may be programmed to be inserted with a plurality of images/colors 31 to entertain when using the pool 32.

The projector assembly 40 includes projector members 42, a microcontroller 42a lamps 43, mirrors 44, a color module 45, a DLP chip 46, a waterproof cover 47, the battery 48, a battery input 48a and a led indicator 49. In a preferred embodiment each of the projector members 42 may be attached to each of the apertures 24 placed around a middle portion of a contour of the housing 22 as can be shown in FIG. 2 the projector members 42 may have a cylindrical shape that conform with the shape of the apertures 24. In the art it may be considered that the projector members 42, the microcontroller 42a, the lamps 43, the mirrors 44, the color module 45, the DLP chip 46 the battery 48, the battery input 48a and the led indicator 49 may be considered as electronic members which may allow the functioning of the projector assembly 40. In a preferred embodiment, the microcontroller 42a may be configured to operate the display of the images/colors 31 by the battery 48 which may power the projector assembly 40.

As known in the art, the microcontroller 42a may send information to the lamps 43 which are reflecting a predetermined frequency through one of the mirrors 44 and the color module 45 which send the predetermined frequency to one of the mirrors 44 which relates to a DLP chip that allows the projector members 42 to display the images/colors 31. It may be suitable for the projector assembly 40 to be completely covered by the waterproof cover 47 that completely cover the projector members 42, the microcontroller 42a, the lamps 43, the mirrors 44, the color module 45, the DLP chip 46 the battery 48, the battery input 48a, the led indicator 49 and the input 29 which is related to the battery 48 as best observed in FIG. 4 to protect from water when immersing the housing 42 in the inner of the pool 32 along the floor thereof.

The drive device system 60 includes a drive device 62, and a wheeled portion 64. In a preferred embodiment, the drive device 62 may entirely cover the bottom portion of the housing 22 considering a circular shape. It is to be considered that the drive device 62 may be related to the microcontroller 42a which may allow control the wheeled portion 64 by the drive device 62. In one embodiment, the drive system 62 may be propelled by a motor (not shown). In another embodiment, the drive device 62 may be propelled by a servomotor. The wheeled portion 64 may have a cylindrical body as shown in FIG. 4 which allows the housing 22 to slide along the surface of the pool 32. It may be considered that the drive device 62 may also be controlled by the remote control 30 which is related to the microcontroller 42a allowing to move the housing 22 in a desired configuration within the pool 32. In one embodiment, the remote control 30 may have a blink configuration for the images/colors 31. In another embodiment the remote control 30 may include a flash configuration for the images/colors 31. In another embodiment, the remote control 30 may have a strobe configuration for the images/colors 31.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A decorative swimming pool illumination device, comprising:
    a housing assembly including a housing, said housing has a dome hollow body, said housing includes apertures extending around a circular contour, said housing includes a remote control which configured to further activate projector members, said housing is capable to remain in a bottom of a pool;
    a projector assembly including said projector members stored in said apertures, said projector members are controlled by a microcontroller and a battery which are covered by a waterproof cover, said waterproof cover is placed in the inner of said housing and related to said apertures and an input, said projector members are configured to display a plurality of images/colors in the bottom of said pool, said projector members also being controlled by said remote control with a plurality of configurations to show said images/colors; and
    a drive device assembly including a drive device, said drive device has a shape conforms with a bottom of said housing to seal thereof, said drive device related to said microcontroller when propelling in the bottom of said pool, said drive device including a wheeled portion which has a cylindrical body that extends along said bottom of said pool.

2. The decorative swimming pool illumination device of claim 1, wherein said input is placed in a bottom contour of said housing includes a sealing cap that allows to protect said input when immersing said housing in a bottom of said pool.

3. The decorative swimming pool illumination device of claim 1, wherein said projector members are configured with a blink configuration, flash configuration and a strobe configuration related to said images/colors.

4. A decorative swimming pool illumination device, consisting of:
    a housing assembly including a housing, said housing has a dome hollow body, said housing includes apertures placed around a middle portion of a circle contour of thereof with cylindric hollow bodies which extends horizontally every 90 degrees around a circular perimeter of said housing, said housing includes a remote control which configured to further activate projector members, said housing is capable to remain in a bottom of a pool, said housing includes an input is placed in a bottom contour thereof to further allow a battery to be charged by an external charger, said housing configured to further to store projector members, said input includes placed in the bottom contour of said housing includes a sealing cap that allows to protect said input when immersing said housing in the bottom of said pool;
    a projector assembly including projector members stored in said aperture, said projector members are controlled by a microcontroller and a battery which are covered by a waterproof cover, said waterproof cover is placed in the inner of said housing and related to said apertures and an input that allows to charge a battery which powers said projector members, said projector members configured to display a plurality of images/colors in the bottom of said pool, said projector members also being controlled by said remote control with a plurality of configurations to show said images/colors, said projector members configured with a blink configuration, flash configuration and a strobe configuration related to said images/colors all controlled by said remote control, said housing including a led power placed a top central portion thereof which indicates status of said projector members and covered by a waterproof cover; and a drive device assembly including a drive device, said drive device has a shape conforms with a bottom of said housing to seal thereof, said drive device related to said microcontroller when propelling in the bottom of said pool, said drive device including a wheeled portion which has a cylindrical body that extends along said bottom of said pool, said drive device controlled by said remote control.

\* \* \* \* \*